Sept. 2, 1969   J. C. WINSLOW   3,464,473
SCREW THREAD LOCK
Filed March 25, 1968

INVENTOR.
JAMES C. WINSLOW
BY Forrest J. Lilly
ATTORNEY

United States Patent Office 3,464,473
Patented Sept. 2, 1969

3,464,473
SCREW THREAD LOCK
James Carl Winslow, Sierra Madre, Calif., assignor to Omark-Winslow Aerospace Tool Co., Portland, Oreg., a corporation of Oregon
Filed Mar. 25, 1968, Ser. No. 715,865
Int. Cl. F16b *39/24, 39/28*
U.S. Cl. 151—7      8 Claims

ABSTRACT OF THE DISCLOSURE

A screw thread lock using at the root of the thread in one mating element of a nut and bolt combination, a plastic element formed with flexible or resilient but stiff teeth which are engaged by the crest of the thread of the other element of the combination. The teeth are elastically bent in the direction of screwing together; and, in the bent condition strongly resist unscrewing.

BACKGROUND OF THE INVENTION

This invention relates to thread locks for screw threaded fastening devices, such as common bolts and nuts.

Thread locks of a large number of types have been conceived and used in the past. A highly desirable feature in a thread lock is one which permits the fastening elements to be screwed together with small torque, but removed only with much larger torque.

The general purpose of the present invention is to provide a simple, inexpensive thread lock having this characteristic.

SUMMARY OF THE INVENTION

According to the invention, and taking the preferred case of a threaded bolt as an example, there is installed at the root of the thread, i.e., at the bottom of the thread groove, as by bonding or fusing, a linearly extended locking element comprised of a suitable tough plastics material, such as nylon or others, which can be molded into shapes which are elastically yieldable and which are stiff and resilient when deformed or deflected. This plastics element which may extend for a portion of a turn of the thread, or for a full turn, or more, depending upon the drag against unscrewing that may be desired, has formed on its exposed or outwardly presented surface, or "back," a row of short but yieldable or bendable projections, such as teeth, ribs, or spines. These teeth are positioned to be engaged by the crest of the mating nut thread, and dimensioned to be elastically deformed, bent or deflected by the nut thread in the direction of turning of the nut, as the latter is set up. The teeth remain in this bent or deflected state, their extremities in pressure engagemen with the rest of the nut, to resist reverse turning of the nut, so as to act somewhat as a ratchet. However, upon application of sufficient reverse torque, the nut can be turned against the deflected teeth, and the nut removed.

DESCRIPTION OF PREFERRED EMBODIMENTS

Figure 1:
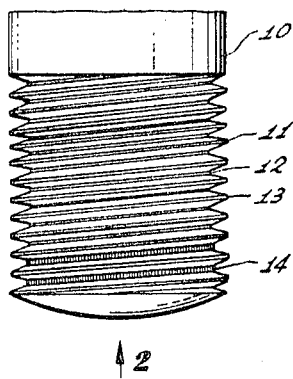
FIG. 1 shows a portion of a threaded bolt equipped with the locking element of my invention.
Figure 3:
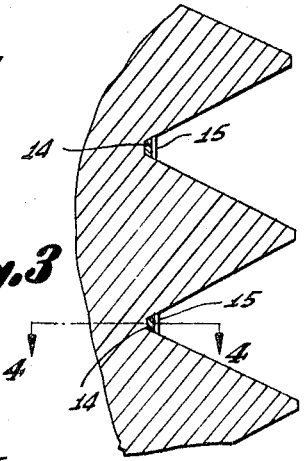
FIG. 3 is an enlarged detail section taken on line 3—3 of FIG. 2.
Figure 2:
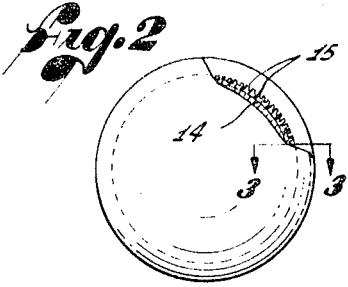
FIG. 2 is a view, with parts broken away, taken in the aspect of the arrow 2 in FIG. 1.

Referring now to the drawings, the numeral 10 designates a bolt or screw, shown here with one typical form of conventional V-screw thread 11, the thread having a root 12 and crest 13.

Figure 4:
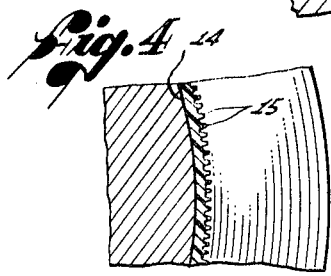
FIG. 4 is a detailed section taken on line 4—4 of FIG. 3.

Installed at or over root 12 is a linearly extended locking element 14, composed of a suitable substance, such as a plastics material as nylon or others found suitable. This locking element may extend for a portion of a turn of the screw thread, or for a full turn, or more, such as approximately two turns as here illustrated, depending upon the reverse drag or locking effort desired. This locking element, thus in the form of a linearly extended element or strip, is bonded or fused in any desired manner to the thread root surface, and its outwardly presented area, or "back," is formed with a multiplicity of spines, studs, or teeth 15. These are arranged preferably in a longitudinal row, as indicated, and normally stand upright (FIG. 4). The elements 15 stand high enough to be interfered with and bent or deflected to the side by the crest 16 of a nut thread 18. They are preferably thin enough relative to their height to be elastically deflected readily to one side (see FIG. 5) by the crest of the nut thread. The teeth are thus elastically deformed circumferentially of the threads. They are also elastically deformable radially of the threads, and this effect may be increased somewhat by thickening the teeth in relation to their length. For example, the tooth height may, in one example, be substantially equal to the mean tooth thickness. The material of the locking element must be such that the teeth are thus resiliently or elastically deformable, though relatively stiff. A plastic, such as nylon, is suitable. Such a plastic also has a desirable "memory" property, such that it is not subject to cold flow, as rubber, but sustains a tendency to return to its initial configuration.

Figure 5:
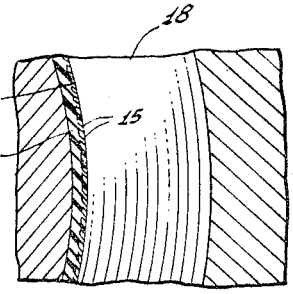
FIG. 5 is a view similar to FIG. 4, but showing a fragmentary portion of the threaded nut engaged with the threaded bolt.
Figure 5A:
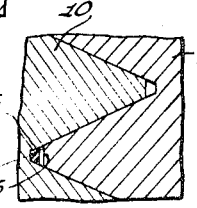
FIG. 5a is a view similar to a portion of FIG. 3, but showing also a portion of the threaded nut.

The parts being in the position of FIG. 5, it will be seen that the extremities of the somewhat bent teeth 15 stand angularly against the surface of the nut thread crest; and while the nut can be readily turned further in its initial direction, these teeth set up a very great resistance to backing off of the nut. It will be seen that the degree of resistance to backing off will depend upon the degree of interference provided and the consequent amount of bending of the teeth. A very secure lock can in fact be obtained by the provision of only a small degree of interference.

Figure 6:
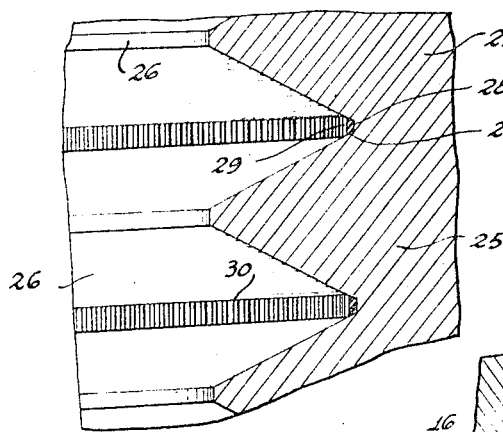
FIG. 6 is a fragmentary view, to an enlarged scale, of an engaged nut thread and bolt thread with the locking element seated on the root of the nut thread.

FIG. 6 shows a fragment of a nut 25 and of a threaded bolt 26 with a locking element 27, as described above, seated and bonded onto the root 28 of the nut thread, so the teeth 29 of the locking element are engaged by the crest 30 of the bolt thread 26. The situation here is the full equivalent of that heretofore described, and no further description should be necessary.

Figures 7, 8:
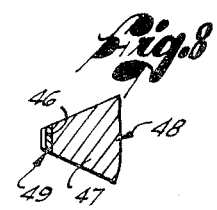
FIGS. 7 and 8 are fragmentary portions of a thread on a screw and a nut, respectively, showing the application of the invention to the crests thereof.

FIG. 7 shows a modification wherein the crest 40 of a thread 41 on a fragmentarily illustrated screw 42 has a toothed plastic locking element 43 thereon, of the character heretofore described, adapted for an interference fit with the root of a complementary thread in a nut or threaded bore (not shown in FIG. 7). The considerations as regards interference fit between the projections or teeth 44 of the locking element 43 and the root of the nut thread are clearly the same as those between the teeth 15 of the locking element 14 and the root 16 of the nut thread in the case of FIG. 5.

FIG. 8 correspondingly shows a modification wherein the crest 46 of a thread 47 in a bore in a fragmentarily illustrated nut 48 has a toothed plastic locking element 49 thereon, of the character of the invention, adapted for an interference fit with the root of a complementary thread on a screw (not shown in FIG. 8). The considerations as regards interference fit between the projections or teeth 50 of the locking element 49 and the root of the thread on the screw are again as described in the earlier embodiments of the invention, e.g., the equivalent of the case of FIG. 5.

The locking projections or teeth are, of course, subject to modification as regards shape, spacing, dimensions, and material. In all cases, there will be locking elements on a thread root, or a thread crest, which are engaged and elastically deformed or deflected by an interfering thread crest, or thread root, as the case may be, into a position such as sets up, by the tendency for elastic return of these locking elements, a frictional binding effect which strongly resists unscrewing. Unscrewing, however, is still possible, and various degrees of resistance to initial screwing on and subsequent screwing off are available merely by control of the dimensions or configurations of the teeth, or of the degree of interference fit, as stated above.

I claim:

1. A screw thread lock for a screw-threaded fastening means including a fastener having a V-thread formed with root and crest thread elements, adapted for mating with a complementary fastening means having a complementary V-thread formed with crest and root thread elements opposed respectively to said root and crest thread elements, a locking element of elastic material secured to one of said root and crest thread elements of the first mentioned V-thread and having an outwardly facing surface formed with a multiplicity of helically spaced thread locking projections in the form of teeth extending radially outward a distance greater than the radial clearance between the mating threads so as to be adapted for interfering engagement with the other of the root and crest thread elements of the second mentioned screw thread, said teeth having both side edges free so as to be elastically deformable circumferentially of the screw threads and thereby radially inwardly thereof by said interfering engagement.

2. The subject matter of claim 1, wherein the locking element embodies a plastics material.

3. The subject matter of claim 2, wherein the first mentioned fastening element comprises a screw.

4. The subject matter of claim 2, wherein the first mentioned fastening element comprises a body having a bore formed therein with said first mentioned screw thread.

5. The subject matter of claim 2, wherein said projections are seated on the root of the screw thread on a screw.

6. The subject matter of claim 4 wherein said projections are seated on the root of the screw thread in said bore.

7. The subject matter of claim 2, wherein said projections are seated on the crest of the screw thread on a screw.

8. The subject matter of claim 4, wherein said projections are seated on the crest of the screw thread in said bore.

References Cited
UNITED STATES PATENTS

| | | | |
|---|---|---|---|
| 2,135,637 | 11/1938 | Gade | 151—22 |
| 2,301,181 | 11/1942 | Ilsemann | 151—22 |
| 2,741,288 | 4/1956 | Johnson | 151—7 |
| 3,297,185 | 1/1967 | Plymale | 151—14 |

RAMON S. BRITTS, Primary Examiner

U.S. Cl. X.R.

151—22